(12) United States Patent
Nelson

(10) Patent No.: US 7,157,913 B2
(45) Date of Patent: Jan. 2, 2007

(54) RE-CONFIGURABLE INDUCTION COIL FOR METAL DETECTION

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 146 days.

(21) Appl. No.: 10/942,159

(22) Filed: Sep. 16, 2004

(65) Prior Publication Data

US 2006/0006874 A1    Jan. 12, 2006

Related U.S. Application Data

(60) Provisional application No. 60/507,816, filed on Oct. 1, 2003.

(51) Int. Cl.
*G01V 3/165* (2006.01)
*G01V 3/11* (2006.01)

(52) U.S. Cl. .................... 324/329; 324/326

(58) Field of Classification Search ............ 324/326, 324/329
See application file for complete search history.

(56) References Cited

U.S. PATENT DOCUMENTS

| | | | |
|---|---|---|---|
| 3,893,025 A | | 7/1975 | Humphreys, Jr. |
| 4,779,048 A | * | 10/1988 | Aichele ............ 324/207.18 |
| 6,489,771 B1 | | 12/2002 | Farque |
| 6,534,985 B1 | | 3/2003 | Holladay, III et al. |

FOREIGN PATENT DOCUMENTS

JP          62-175688          8/1987

* cited by examiner

*Primary Examiner*—Bot LeDynh
(74) *Attorney, Agent, or Firm*—Albert J. Fasulo, II

(57) ABSTRACT

A device in which the receiver coil of a pulse inductive metal detector is capable of switching between a differential configuration (i.e., gradiometer configuration) to a non-differential or summing configuration under control of the operator or computer.

6 Claims, 5 Drawing Sheets

RE-CONFIGURABLE INDUCTION COIL FOR METAL DETECTION

CROSS-REFERENCE TO RELATED APPLICATIONS

This application claims the benefit of U.S. provisional application No. 60/507,816, filed on Oct. 1, 2003, which is incorporated herein by reference in its entirety.

STATEMENT OF GOVERNMENTAL INTEREST

This invention was made with U.S. Government support under Army contract no. N00024-98-D-8124. The U.S. Government has certain rights in this invention.

BACKGROUND

There are an estimated 100 million mines and countless millions of acres of land contaminated with unexploded ordnance (UXO) worldwide. Thus, there is a need for sensor systems and methods that can detect and identify large and small metal objects buried in soil. Such objects often are mines and UXOs.

A commonly used sensor for mine and UXO detection is the electromagnetic induction (EMI) metal detector. Conventional EMI metal detectors use either frequency-domain (FD) or time-domain (TD or pulse) eddy current methods and can detect small metal targets (such as plastic-cased low-metal content mines) at shallow depths and large metal targets (such as metal-cased high-metal content mines and UXOs) at both shallow and deep depths under a wide range of environmental and soil conditions. However, metal non-mine (i.e., clutter) objects commonly found in the environment pose a major problem in identifying mines. That is because these clutter objects create false alarms when detected by a metal detector. For time-efficient and cost-effective land clearing, the detected metal targets must be classified as to their threat potential: mine, UXO or clutter. Preferably, these metal targets need to be classified in real-time or near real-time.

FIG. 1 is a block diagram of a conventional pulsed EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter loop current is then turned off. The transmitter current is typically a pulsed waveform. For example, a square-wave, triangle or saw-tooth pulsed waveform, or a combination of different positive and negative current ramps.

According to Faraday's Law, the collapsing magnetic field induces an electromotive force (EMF) in nearby conductors, such as the metal target 12. This EMF induces eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field that is detected by a magnetic field receiver 14 located above the ground and coupled to the transmitter 10 via a data acquisition and control system 16.

Pulse induction metal detector (PIMD) antennas (transmitter and receiver coil) come in two basic types as shown in FIGS. 2a and 2b. The first type of PIMD shown in FIG. 2a illustrates a single combined transmitter and receiver coil 23 and damping resistor 22 with multiple loops of wire forming the coil 23. A current pulse is sent through the multiple turn coil 23 and the received metal detection signal is sensed by the same coil 23. The small voltage generated by the metal target is typically amplified by a high gain electronic amplifier 25 (typical gain factor of 100 to 1000). A protection circuit 24 is provided to protect the sensitive amplifier from the high kick-back voltage pulse generated by switching the inductive coil off abruptly (V=L di/dt, where L is the inductance of the transmitter coil and di/dt is the slope of the current decay in the coil).

The second type of PIMD illustrated in FIG. 2b uses a separate coil 27 and damping resistor 26 for the transmitter and a coil 29 and damping resistor 28 for the receiver. This configuration provides isolation between the transmitter circuit and the receiver circuit and allows for more flexibility in the receiver coil 29 (e.g., different number of turns, size or differential coil configuration) and amplifier circuit design (e.g., single ended operation of electronics). The high gain amplifier 25 also sees the high kick-back voltage pulse generated by switching the transmitter coil 27 off abruptly and protection circuitry 24 is needed to protect it from damage.

Typically, for low-metal mine detection the transmitter and receiver coils (commonly called the antenna) are concentric and are about 8" to 12" in diameter. This antenna size is to facilitate the portability of the metal detection sensor (e.g., light weight) and to aid in localizing the detected metal (small detection footprint). A smaller antenna size limits the detection depth and a larger antenna size hinders the portability and localization capability of the metal detection sensor for small metal objects.

Metal target classification places additional constraints on a metal detector antenna design. For small metal classification, the above antenna size is appropriate since the low-metal mine metal targets are much smaller than the antenna size (typically, less than 0.25"). For example, the metal object is fully illuminated (with a relatively uniform magnetic field) by the transmitting magnetic field coil and the re-radiated magnetic field is fully received by the receiver coil. The exact placement of the antenna over the metal object is not critical since the transmitter and receiver magnetic field uniformity is relatively large. However, when metal objects are encountered that are on the order of or larger than the metal detector antenna, the metal signature from the detected magnetic field is not unique and can confound a metal classification process. The random placement of the metal detector antenna over a large metal object excites the metal object with different magnetic field vector angles and strengths. The resulting magnetic field signatures are then dependent on the exact placement and orientation of the antenna and the unknown metal object. Since the relative positional information is not known for a hidden or buried object, classification of the metal object is difficult.

FIG. 3 shows the basic configuration of a differential receiver coil for a pulse inductive metal detector (PIMD). These antennas are generally larger than the above single transmitter/receiver coil antennas to allow for a relatively large receiver coil to be placed inside the single transmitter coil. The configuration of the receiver coil is known by different names like a FIG. 8, a gradiometer, or a balanced coil. There are many advantages to a differential receiver coil arrangement. In low-metal content mine detection the major advantage of the differential receiver coil configuration is passive ground return cancellation which allows the metal detector to sense small metal objects in the presence of mineralized soil.

Another advantage of the differential receiver coil is the decoupling of the transmitter pulse from the receiver signal which allows for a faster responding metal detection signal (high bandwidth). A disadvantage of the differential coil arrangement is the need for placing two receiver coils within a given transmitter coil dimension. This naturally limits the receiver coil size and hence the detection depth (metal detection sensitivity and detection depth are functions of the transmitter and receiver coil size). This size constraint does not adversely effect a typical metal detector for landmines since small metal objects characterized by low-metal mines are generally placed within the top few inches of the ground. However, when a large metal object such as a UXO or high metal content mine is encountered with a differential configured receiver coil, the size of the object is sometimes as large or larger than the receiver coil. The receiver coil does not measure the time decay signature of the object correctly for classification purposes. Large objects do not necessarily need the ground balancing of the differential coil arrangement (e.g., large metal object signature is much larger than ground response signature) nor the other advantages convened by the differential coil arrangement (large metal objects have a lower bandwidth compared to small metal objects). Large metal objects are sometimes buried deep in the ground and a differential receiver coil arrangement (for a given transmitter coil size) has relatively poor depth sensitivity.

Thus, there is a need to combine the advantages of a differential receiver coil antenna design (for small metal objects) with a single receiver coil design (for large metal objects) into one metal detection device. By combining the features of both receiver coil configurations into one device we overcome the limitations of each device separately.

SUMMARY

The present invention is a pulse inductive metal detector that can selectively change the receiver coil configuration from a differential configuration good for detecting and classifying smaller metal objects to a summing configuration good for detecting and classifying larger metal objects. A transmitter coil induces eddy currents in a nearby metal target. The operator can then select to configure the receiver coil in a differential configuration for small metal target detection and classification or a summing configuration for larger metal target detection and classification. The conversion from one mode to the other is achieved by a switch coupled with the receiver coil that switches couplings in the receiver coil to create either a differential or summing configuration. A computer can be coupled with the switch for assisting the operator in controlling the switch setting.

DETAILED DESCRIPTION

The present invention applies to pulse inductive metal detectors (PIMDs) and allows for the receiver coil to be re-configurable as either two coils connected in a differential coil configuration or a single coil, the single coil being a summing of the two coils comprising the differential receiver coil configuration.

Figure 1:
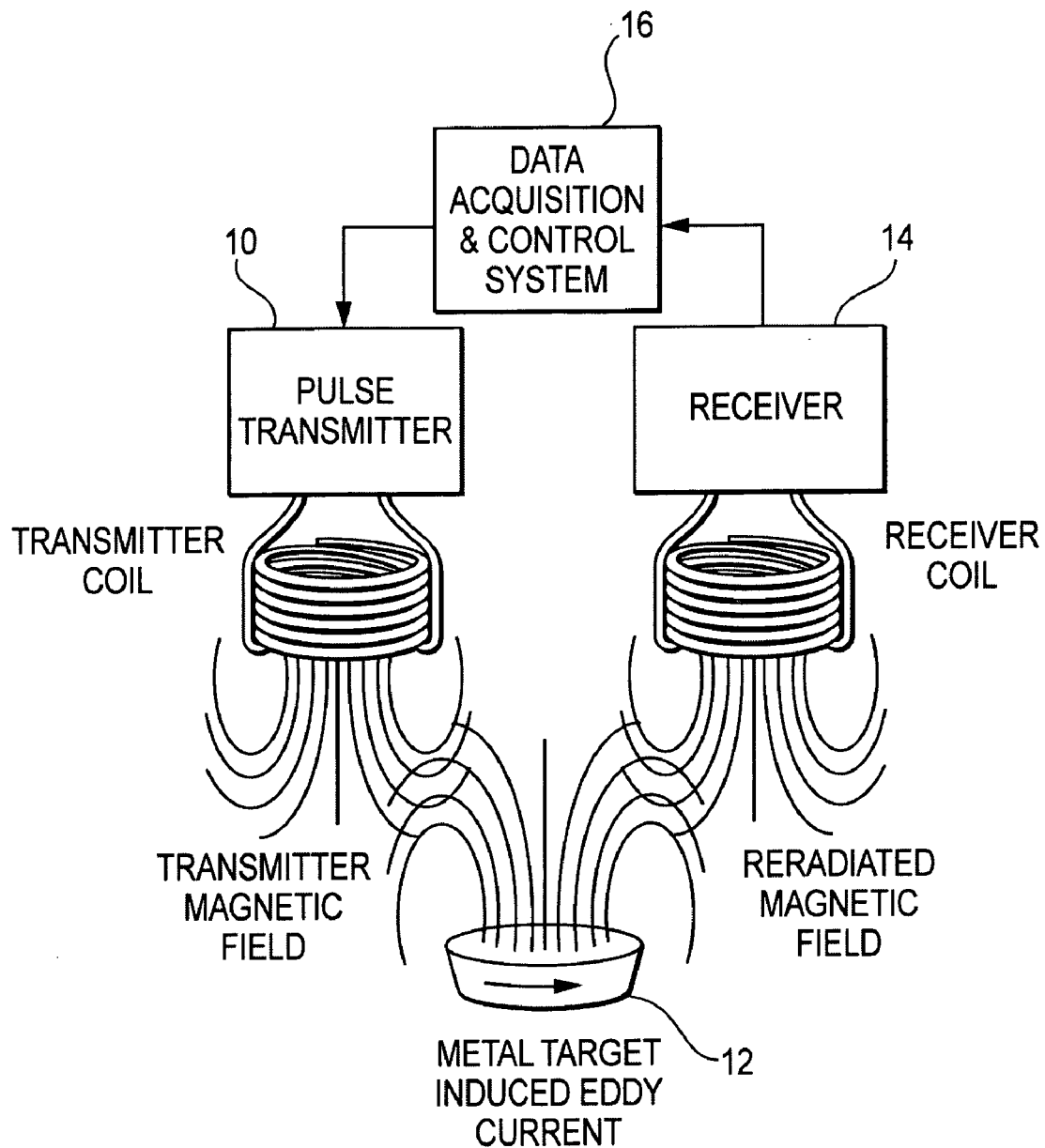
FIG. 1 illustrates a block diagram of a conventional pulsed EMI metal detector and method of operation.
Figure 2A:
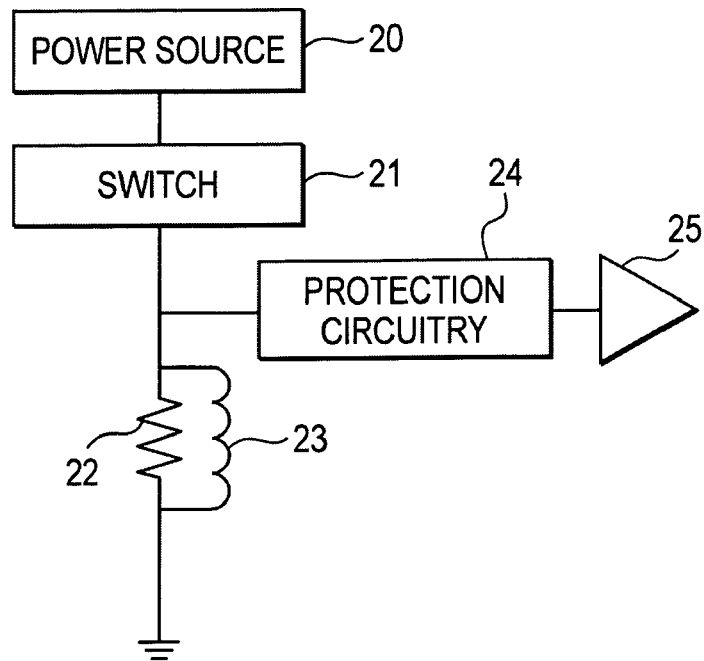
FIG. 2a illustrates a PIMD having a single transmit and receiver coil with multiple loops of wire forming the coil.
Figure 2B:
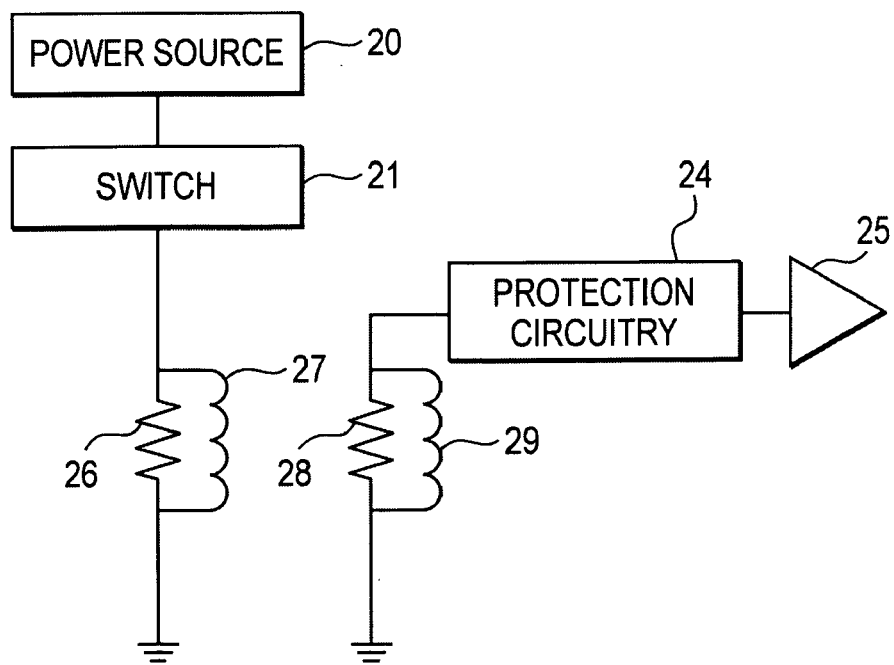
FIG. 2b illustrates a PIMD having a separate transmit and receiver coils with multiple loops of wire forming each coil.
Figure 3:
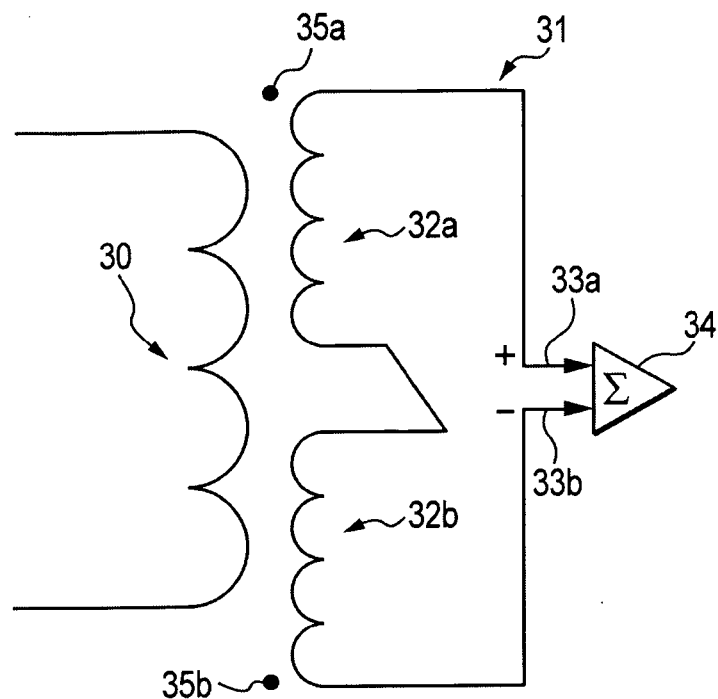
FIG. 3 is a circuit diagram of an example PIMD differential coil configuration.

FIG. 3 illustrates a transmitter coil 30 and a receiver coil 31 configured as a differential coil. Receiver coil 31 includes coil components 32a, 32b (such as coil windings 32a, 32b) having respective outputs 33a, 33b feeding respective inputs of a summing amplifier 34. Outputs 33a, 33b are signals (e.g., current) indicative of changing magnetic flux detected by or coupled into respective coils 32a, 32b. The position of black dots 35a, 35b in FIG. 3 indicates that the windings 32a and 32b are connected together such that they are wound in opposite directions or senses relative to each other. As a result, outputs 33a, 33b have opposite polarities, that is, outputs 33a, 33b form a differential pair of signals as applied to the inputs of summing amplifier 34.

Figure 4:
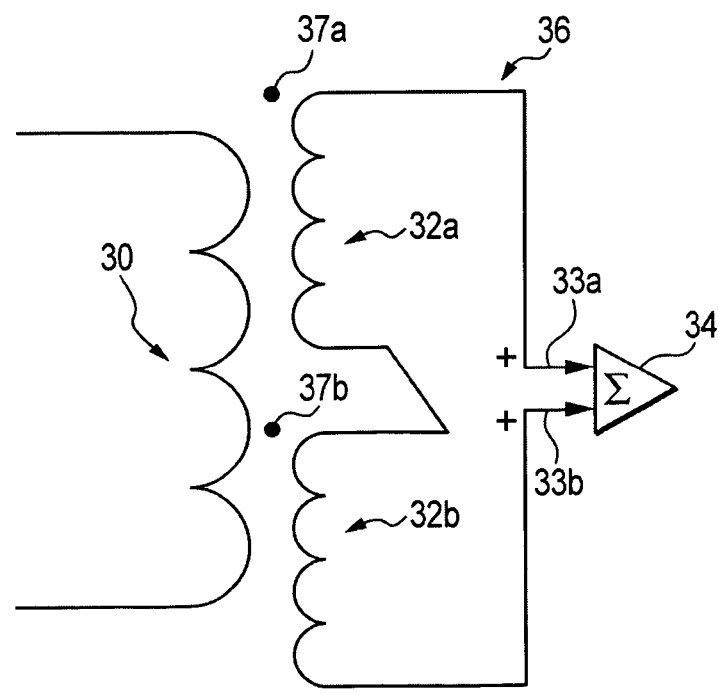
FIG. 4 is a circuit diagram of an example PIMD summing coil configuration.

FIG. 4 illustrates a transmitter coil 30 and a receiver coil 36 configured as a summing coil. The position of black dots 37a, 37b in FIG. 4 indicates the windings 32a and 32b are connected together such that they are wound in the same direction or sense relative to each other. As a result, outputs 33a, 33b have the same polarities, that is, outputs 33a, 33b form a summing or additive pair of signals as applied to the inputs of summing amplifier 34.

Figure 5A:
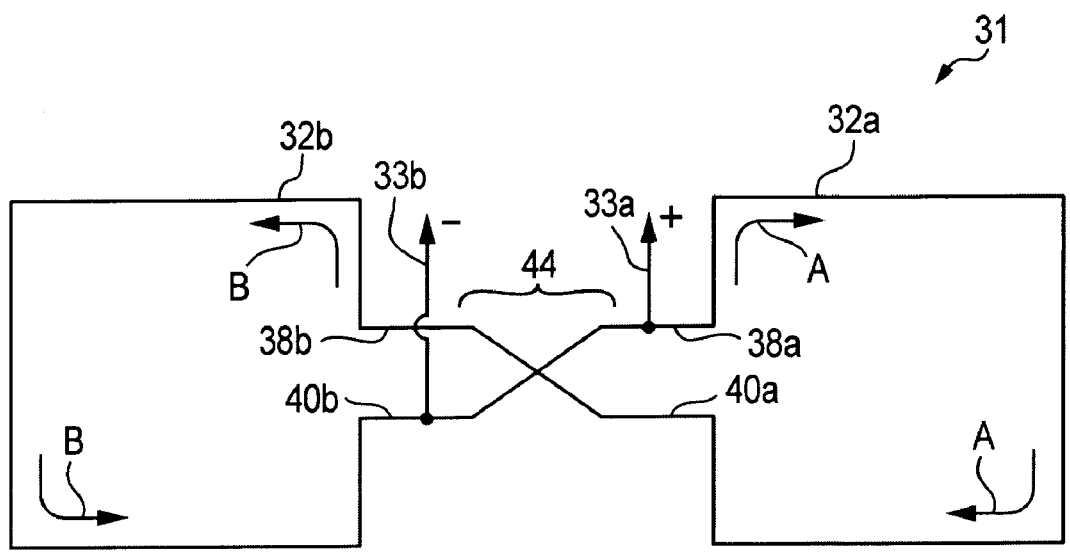
FIG. 5a is a an example physical circuit layout for the differential circuit of FIG. 3.

FIG. 5a is a an example physical circuit layout for differential coil 31 of FIG. 3. Differentially configured receiver coil 31 is in the pattern of a figure-eight, as described in more detail below. In the embodiment of FIG. 5a, each of coil components or windings 32a, 32b includes a substantially planar single winding or loop of wire, however, each of windings 32a, 32b typically includes multiple windings or loops of wire. The wire may be wound around an air core (i.e., an air-wound coil), or alternatively, a ferromagnetic core.

Each loop in winding 32a includes opposing ends 38a and 40a, and each loop in winding 32b includes opposing ends 38b and 40b. Opposing ends 38a, 40a are connected to opposing ends 38b, 40b in a coupling or connecting region 44, in a manner described below in connection with FIG. 6. In the embodiment of FIG. 5a, opposing ends 38a, 40a are connected to opposing ends 38b, 40b in a criss-cross ("X") manner so as to configure receiver coil 31 overall as a "figure-eight." In this configuration, windings 32a, 32b are wound in opposite directions, as indicated by clockwise and counter-clockwise arrows A and B. Arrows A and B also respectively indicate the directions of currents induced in windings 32a, 32b when a changing magnetic field intersects the windings. Thus, outputs 33a, 33b have opposite polarities or senses, that is, are differential.

Figure 5B:
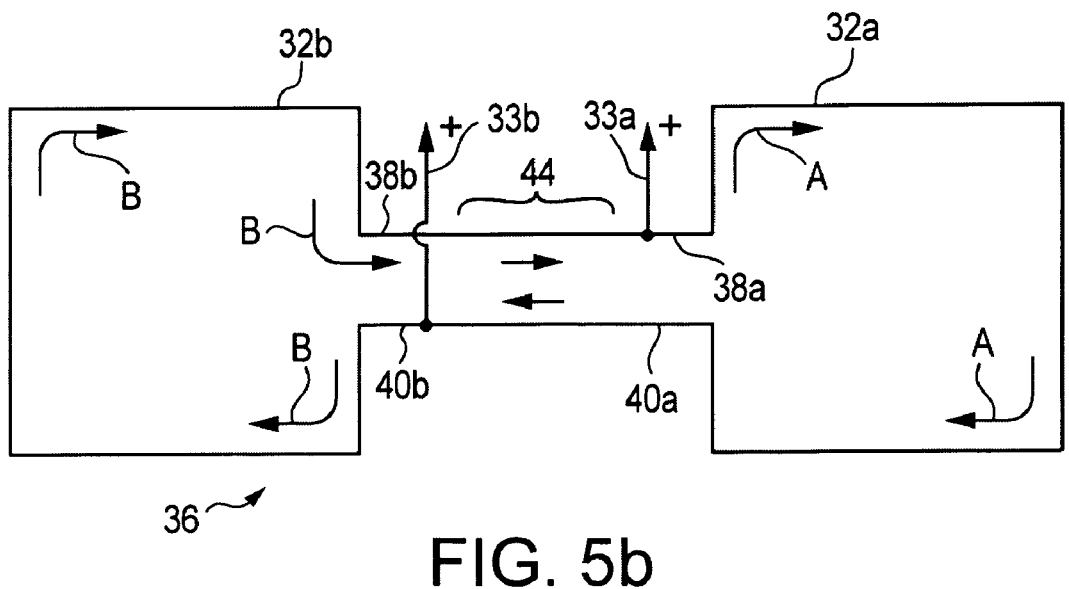
FIG. 5b is a an example physical circuit layout for the summing circuit of FIG. 4.

FIG. 5b is a an example physical circuit layout for summing coil 36 of FIG. 4. In the embodiment depicted in FIG. 5b, opposing ends 38a, 40a are connected to opposing ends 38b, 40b in connecting region 44 so as to not criss-cross ("X"). In this non-criss-cross configuration, windings 32a, 32b are wound in the same directions, as indicated by clockwise arrows A and B. Currents flow in each of coils 32a, 32b in the same direction. Thus, outputs 33a, 33b have the same polarities or senses, that is, are summing outputs.

In both of the embodiments of FIGS. 5a and 5b, coil windings 32a, 32b are substantially planar, and are adjacent to but spaced-apart from each other so that they do not overlap one another. That is, the coils are arranged side-by-side so as to not overlap each other.

Figure 6:
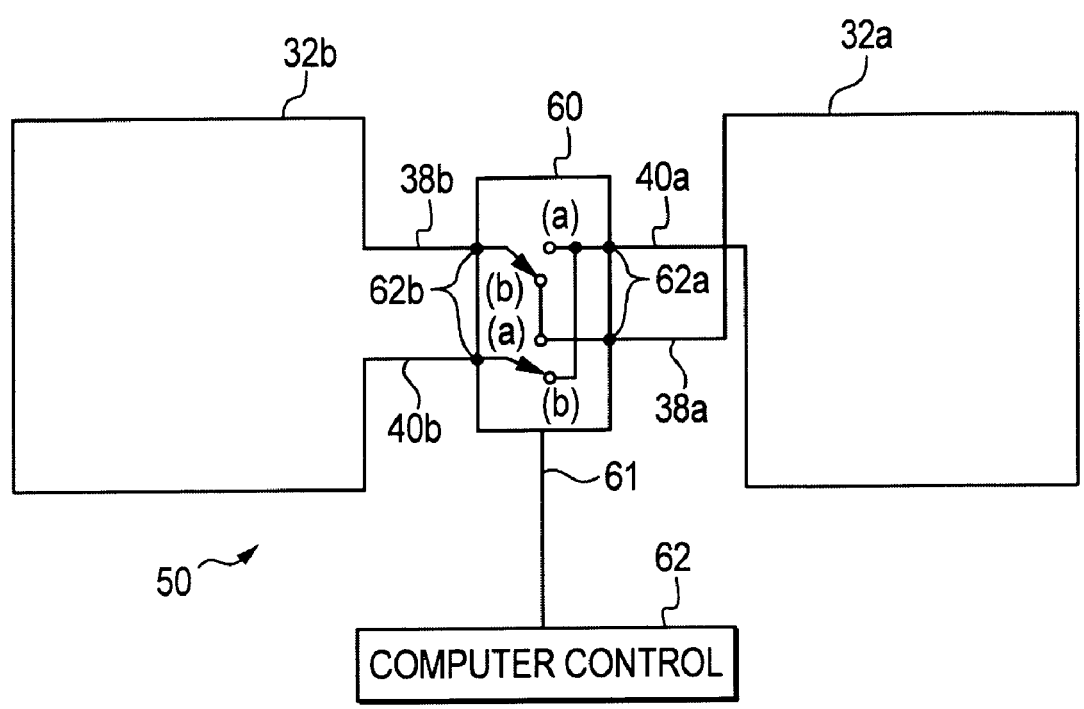
FIG. 6 illustrates an embodiment of a switched receiver coil including a switch mechanism for selecting between a differential or summing configuration of the receiver coil.

FIG. 6 illustrates an example switched receiver coil 50 including a switch 60 connected between windings 32a, 32b for selectively configuring coil 50 between differential configuration 31 and summing configuration 36, responsive to a control signal 61 from a computer controller 62. An operator can control positions (depicted at (a) and (b) in FIG. 6) of switch 60, and thus, the configuration of coil 50, via an interface with computer 62.

Switch 60 includes terminals 62b connected to ends 38b, 40b of windings 32b, and terminals 62a connected to ends 38a, 40a. Switch 60a has a selectable first position (depicted at (b) in FIG. 6) that connects end 38a to end 38b, and end 40a to end 40b, thereby configuring receiver coil 50 as summing coil 36, as depicted in FIG. 5b.

Switch 60a has a selectable second position (as depicted at (a) in FIG. 6) that connects end 38a to end 40b, and end 40a to end 38b, thereby configuring receiver coil 50 as differential coil 31, as depicted in FIG. 5a.

In the summing configuration (position (b) in FIG. 6), the two receive coils form a physically larger coil that can detect the eddy current decay signature of large targets more effectively and with greater sensitivity (better depth detection). Typically, a mine detection differential antenna is about 10" by 20" with a receiver coil about 10" by 10". If a buried metal object that is on the order of these dimensions is encountered at a depth of many inches, the excitation magnetic field and received magnetic field by the differential receiver is complex making target classification difficult. If the receiver coils were connected in a differential configuration (position (a) in FIG. 6), the signal from a large object beneath the coils would be close to zero after performing the differential algorithm unless the metal object was off to one side of the sensor head (transmitter/receiver coil). Either way, classifying such a relatively large object would be much more difficult in a differential receiver coil configuration.

If the receiver coil encountered the same metal object and the operator switched the receiver coil to a summing configuration, the larger receiver coil configuration can more easily process the eddy current decay signature of the metal object.

Thus, the operator can toggle between small and large metal target modes using the same metal detector by simply altering the configuration of the receiver coil.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A pulse inductive metal detector comprising:
   a transmitter coil for inducing eddy currents in a nearby metal target; and
   a selectively configurable receiver coil including a receiver coil switch having
   (i) a first position that places the receiver coil into a differential configuration suited for small metal target detection and classification, and
   (ii) a second position that places the receiver coil into a summing configuration suited for larger metal target detection and classification.

2. The metal detector of claim 1 wherein the receiver coil includes first coil windings that provide a first output, and second coil windings that provide a second output, and the switch is connected between the first and second coil windings, and wherein
   (i) the first switch position connects together the first and second coil windings such the first and second outputs have opposite polarities, and
   (ii) the second switch position connects together the first and second coil windings such that the first and second outputs have the same polarity.

3. The pulse inductive metal detector of claim 1 further comprising a computer coupled with the switch for controlling the switching of the switch.

4. A pulse inductive metal detector comprising:
   a transmitter coil for inducing eddy currents in a nearby metal target; and
   a receiver coil including:
   a first coil winding having first opposing ends;
   a second coil winding having second opposing ends; and
   a configurable coil switch coupled between the first and second opposing ends and having
      a first position that couples the first opposing ends to the second opposing ends such that the first and second windings provide respective output signals having the same polarity when a changing magnetic flux induced by the eddy currents intersects the first and second coil windings, and
      a second position that couples the opposing first and second ends together such that the first and second windings provide respective output signals having opposite polarities when the changing magnetic flux intersects the first and second coil windings.

5. The metal detector of claim 4, wherein the first position of the switch places the receiver coil into a summing configuration and the second position of the switch places the receiver coil into a figure-eight differential configuration.

6. The metal detector of claim 5, wherein the first coil winding is a substantially planar air-wound coil and the second coil winding is a substantially planar air-wound coil that does not overlap the first winding.

* * * * *